United States Patent Office 3,201,562
Patented Aug. 17, 1965

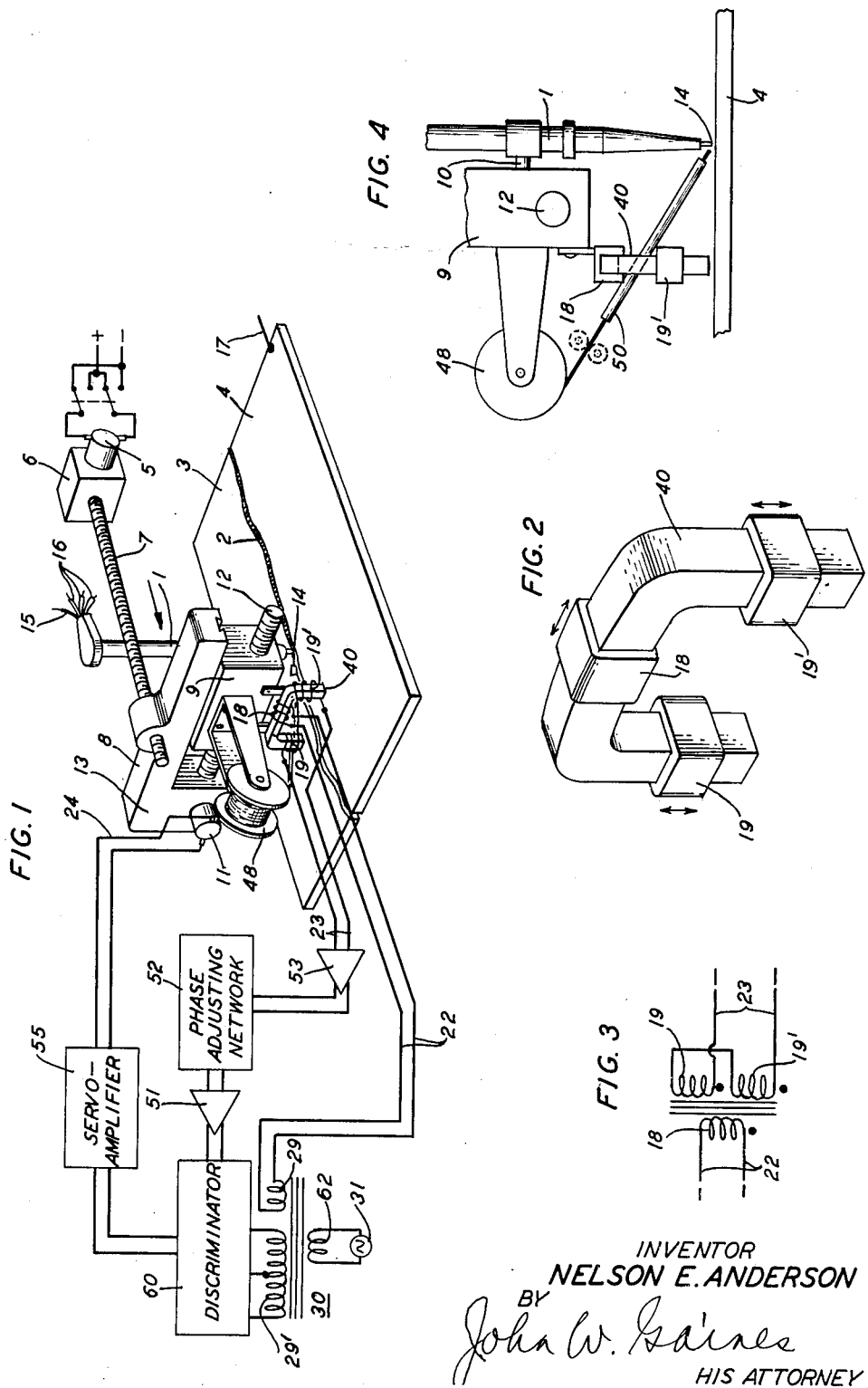
INVENTOR
NELSON E. ANDERSON
BY
John W. Gaines
HIS ATTORNEY

3,201,562
STABILIZED EDDY CURRENT SEAM FOLLOWER
Nelson Edward Anderson, Berkeley Heights, N.J.; Severa B. Anderson, administratrix of said Nelson E. Anderson, deceased, assignor to Air Reduction Company, Incorporated, New York, N.Y., a corporation of New York
Filed Feb. 28, 1963, Ser. No. 261,675
7 Claims. (Cl. 219—125)

This invention relates to eddy current seam followers, as used for example in electric arc welding, and more particularly to more stable means for adjusting the eddy current generating and detecting devices of seam followers to a balanced initial condition before bringing such devices into proximity to the seam to be followed.

An object of the invention is to improve the stability in general of the initial adjustment of the eddy current generating and detecting devices and especially to improve the stability with regard to temperature changes.

Another object is to lessen the sensitivity of the eddy current devices to the presence of other conductive bodies in the neighborhood of the seam to be followed.

Another object is to improve the depth of penetration of the eddy currents into workpieces composed of electrically highly conductive metals such as copper and aluminum.

A feature of the invention is the use of mechanical rather than electrical or magnetic means of balance, thereby avoiding changes in the electrical parameters of the balancing coils due to heating of the coils by balancing currents passing through the coils, and thereby adding to the stability of the device, particularly the temperature stability.

Another feature is the use of a three-legged magnetic structure to provide the magnetic cores for an eddy current generating winding and two spaced detecting windings, the latter two being mounted on opposite sides of the seam to be followed, the generating winding and at least one of the detecting windings being movable mechanically along the length of the respective leg to provide initial adjustment of balance.

A related feature lies in the fact that the position adjustment of the detecting winding or windings is mainly effective to balance the magnitudes of the effects in the two detecting windings while the position adjustment of the generating winding is mainly effective to balance the phases of the effects in the two detecting windings.

Another feature is the use of a magnetic core structure in an inverted U-shape which provides space for introducing filler wire to the weld through the open space of the "U."

A further feature is the placing of the generating coil on the middle portion of the "U" and the detecting coils on the vertical end portions.

Another feature is the use of a magnetic core of iron to increase the sensitivity of the device and to effectively restrict the magnetic influence of the device to the workpieces without spreading to other nearby metal objects.

A further feature is operation of the device in the relatively low frequency range of 400 to 60 cycles per second to increase the depth of penetration of the magnetic field into the workpieces.

Other features, objects and advantages will appear from the following more detailed description of an illustrative embodiment of the invention, which will now be given in conjunction with the accompanying drawings.

In the drawings:

FIG. 1 is a representation of the mechanical and electrical parts of an automatic welding machine which is controlled to traverse a welding agency lengthwise of a seam between two workparts and center the welding agency over the seam when the direction of the seam does not correspond with the lengthwise travel of the welding agency in the machine, together with a schematic showing of the relation to the welding machine of the electromagnetic elements which may be balanced in accordance with the invention;

FIG. 2 is a perspective view of the said electromagnetic elements shown apart from the welding machine for the sake of clarity;

FIG. 3 is a schematic circuit diagram of the interconnections of said electromagnetic elements and their connections to the remainder of the system of FIG. 1; and FIG. 4 is a fragmentary elevational view of a portion of the system of FIG. 1, showing an arrangement for feeding a filler wire to the electric arc through the open space between the legs of a U-shaped magnet core.

A welding agent 1 is traversed lengthwise of a seam 2 between the seam defining parts or workpieces 3 and 4 by an electric motor 5. The motor 5 is connected through gearing in a casing 6 to a lead screw 7 which extends generally in the lengthwise direction of the seam. This lead screw 7 imparts motion to a carrier 8 which acts as a support for a slide 9 on which the welding agency 1 is mounted by a bracket 10. The slide 9 is movable crosswise of the seam relative to its carrier 8 by an electric motor 11 which imparts rotation to a cross-adjusting screw 12 with which it is connected through gearing in casing 13 forming part of carrier 8. Motor 11 and its gear transmission 13 is supported on one end of the carrier 8 and the cross-adjusting screw 12 makes a threaded engagement with the slide 9. The arrangement is such that reverse rotation of motor 11 will reversely adjust slide 9 relative to its carrier 8 to position the welding agency laterally of the seam as it is traversed lengthwise thereof by the electric motor 5 acting through its gear transmission 6 and lead screw 7 which engages and drives carrier 8.

The electric motor 5 is connected as indicated to a source of supply by means of which its speed and direction of rotation are controlled to traverse the welding agency 1 along the seam between the workparts. In the arrangement shown the motors 5 and 11 are direct current shunt motors although it is quite obvious that other types of motors may be employed. It is of course understood that the parts of the machine just described are suitably supported relative to one another and to the workparts by other members of the machine which, for clarity of illustration, have not been shown in the drawing. Also the workparts will be held in assembled relationship in a clamp or clamps forming part of the machine or forming part of a jig which may be positioned in the machine or the machine may be positioned on or over the workparts which are otherwise assembled as by tack welding at spaced positions along the seam between them.

Any suitable welding agency 1 may be employed and the one illustrated in the drawing is a gas-arc torch in which a shielding atmosphere is supplied about the arcing terminal of an electrode and the portions of the work rendered molten by an arc established between this electrode and the workparts. It may have the construction illustrated and described in my United States Letters Patent 2,512,705 for Fluid-Cooled Gas-Blanketed Arc Welding Torch, granted on June 27, 1950, on an invention made jointly with George R. Turbett. Welding current is supplied to the electrode 14 of the torch through a welding cable 15 and cooling fluid and shielding gas are supplied thereto through hoses 16. The return circuit for welding current is by way of a welding cable 17 which is connected to the workparts 3 and 4. Any suitable source of welding current supply may be connected between the cables 15 and 17.

An exciter coil 18 and two pick-up coils 19, 19' are positioned in proximity to the surface of the workparts 3 and 4 at the seam 2. The coils 18, 19, 19' are mounted upon an inverted U-shaped magnet core 40, with the pick-up coils 19, 19' on opposite legs of the core 40 and the exciter coil 18 on the horizontal middle portion of the core, as shown more clearly in FIG. 2. The core 40 may be supported from the slide 9. The coils 18, 19 and 19' are initially slidably mounted and adjustable in position along the core 40 as indicated by double-headed arrows in the drawing.

The energizing current for the exciter coil 18 is supplied from a source 31 which may be an ordinary 60 cycle per second alternating current source. The connection from the source 31 to the coil 18 is by way of primary winding 62 of a transformer 30, a secondary winding 29 of the transformer, and leads 22. The source 31 is also connected through a divided secondary winding 29' of the transformer 30 to a push-pull input of a discriminator 60. The pick-up coils 19, 19' are connected in series opposition to each other to leads 23, as shown in FIG. 3, and thence through an amplifier 53, a phase adjusting network 52 and an amplifier 51 to a second input, a parallel input, to the discriminator 60. The output of the discriminator 60 is connected through a servo-amplifier 55 and leads 24 to the motor 11. In FIG. 3, each of the heavy dots indicates the beginning end of a winding with reference to the magnetic core, all the windings being wound in the same sense, for example all clockwise as viewed from the beginning of the winding.

The discriminator 60 is of the type disclosed in my U.S. Patent No. 2,921,179, issued January 12, 1960, for Electromagnetically Locating and Following Workpart Configurations, and operates in similar manner.

When the pick-up coils 19, 19' are symmetrically located with respect to the seam and properly adjusted in position along the core 40, as explained below, and when the exciter coil is properly positioned along the core 40, as explained below, no signal voltage is induced in the leads 23. Thus, no signal voltage is applied to the phase adjusting network 52 and amplifiers 51, 53 to the parallel input of the discriminator 60. Under this condition, there is no output from the discriminator 60 and none from the servo-amplifier 55.

When the pick-up coils 19, 19' are unsymmetrically located with respect to the seam, an alternating current signal of one or the other polarity is induced in the leads 23 and applied to the parallel input of the discriminator 60. Under this condition, there is a direct current output from the discriminator 60 and an amplified direct current output from the servo-amplifier 55 depending in direction upon which of the pick-up coils 19, 19' is displaced toward the seam 4 and which away from the seam. The strength of this current is in proportion to the amount of displacement of the pick-up coils 19, 19' from the symmetrically disposed position. The voltage from the servo-amplifier 55 controls the rotation of the motor 11 in direction and amount so as to restore the slide 9 to bring the pick-up coils 19, 19' back to the centered position, at the same time bringing the welding agency 1 back to a centered position and causing the welding agency to follow the seam as the welding agency is traversed generally lengthwise of the seam by the operation of the motor 5.

From the above description it is believed to be apparent that as coils 18, 19, 19' are traversed lengthwise of seam 2 between workparts 3 and 4, any deviations from correspondence between the path of travel of the welding machine from the direction of the seam between the workparts will induce voltage in the pick-up coil circuit which through operation of the control circuit for the motor 11 will operate the motor to position the pick-up coils symmetrically with respect to the seam and consequently at the same time position the welding machine over the seam.

For further details concerning the operation of the seam follower to which the present improvements relate, reference may be made to my above cited U.S. Patent No. 2,921,179.

Adjustment of the position of the exciter coil 18 along the horizontal leg of the core 40 is found to have little or no effect upon the magnitudes of the signals picked up by either of the pick-up coils 19, 19' but does have a considerable effect upon the relative phases of the signals picked up in the two coils. With the coils 19, 19' connected in series opposition, the position of the exciter coil 18 may be adjusted manually until signals from coils 19 and 19' are in phase, and the coil 18 cemented in place.

Adjustment of the position of the coils 19 and 19' along the vertical leg of the core 40 is found to have little or no effect upon the relative phases of the signals picked up by the coils 19, 19' but does have a considerable effect upon the relative magnitudes of the signals picked up in the two coils. To adjust the relative magnitudes of the signals, the two coils may be manually adjusted in position with respect to each other to obtain a minimum signal in the leads 23. The coil positions may be adjusted alternately until the least obtainable signal is picked up in the leads 23. The coils may then be cemented in place.

The adjustment of the coils should be made with the core remote from any metal article. In this manner an initial magnetic balance of the pick-up circuit may be achieved without the use of balancing currents. The method of balancing described herein has been found to avoid temperature instability which may occur when the balance is obtained by means of currents in the coils. Such balancing currents cause ohmic heating of the coils and this heating can change the electrical characteristics of the coils, thereby giving rise to the instability.

I have found that it is not only feasible to use a magnetic core of iron in the exciter and pick-up coils operating at a frequency as low as 400 or 60 cycles per second, but also that it is particularly advantageous to go to a frequency as low as 60 cycles per second. This is because at the lower frequencies the penetration of the magnetic field from the exciter coil is better and deeper than at the higher frequencies, as explained in my prior patent, cited. This is important particularly in workpieces composed of highly conductive metal, such as copper and aluminum. The use of the magnetic core augments the strength of the magnetic field, thereby improving the sensitivity of the device. Moreover, the use of the magnetic core effectively restricts the magnetic field mainly to the core and to the space immediately surrounding the ends of the core.

Thus, the magnetic field is relatively unaffected by the presence of metal objects other than the workpieces, as such other objects are generally sufficiently remote to be outside the magnetic influence of the exciter coil.

Filler wire may be supplied to the weld from a reel 48 attached to the slide 9, through a guide tube 50 passing through the open space of the U-shaped core 40, as shown in FIG. 4. The filler wire chosen necessarily depends upon the metal composition of the workpieces, and can be, e.g., copper or aluminum for the highly conductive copper or aluminum workpieces already mentioned. Stainless steel wire can be employed and also ferrous wire, although the low exciter coil frequencies preferred herein do not apply to welding operations for steels and others of the hightly magnetic ferrous and non-ferrous metals.

While illustrative forms of apparatus and methods in accordance with the invention have been described and shown herein, it will be understood that numerous changes may be made without departing from the general principles and scope of the invention.

I claim:

1. In an eddy current seam follower, in combination, a U-shaped magnetic core, a pair of pick-up coils mounted on the two opposite legs of the said core, an exciter coil mounted on the middle portion of the said core, the position of said exciter coil along said core relative to said pick-up coils being such that a magnetic field set up in said core in the absence of nearby metal objects by said exciter coil induces voltages substantially in phase with each other in said pick-up coils, and the relative positions of said pick-up coils along said core relative to said exciter coil being such that a magnetic field set up in said core by said exciter coil in the absence of nearby metal objects induces substantially equal magnitudes of voltages in said two pick-up coils, and means connecting said pick-up coils in phase opposing relationship.

2. The combination, according to claim 1, in which the two said pick-up coils are substantially identical.

3. The combination, according to claim 2, in which the two said pick-up coils are substantially transversely aligned with one another on said core.

4. In an eddy current seam following and welding structure, in combination with a diagonally downwardly disposed guiding means for feeding a consumable wire electrode to the weld seam in which the metal of the wire is being deposited, a magnetic core of inverted U-shaped receiving the guiding means in substantially laterally centered relation within the space between the two opposite legs of the core, a pair of pick-up coils mounted on said two opposite legs of the core, an exciter coil mounted on the top middle portion of the core, the position of said exciter coil relative to said pick-up coils being such that a magnetic field set up by said exciter coil in said core in the absence of nearby metal objects induces voltages substantially in phase with each other in said pick-up coils, and the relative positions of said pick-up coils along said core relative to said exciter coil being such that a magnetic field set up by said exciter coil in said core in the absence of nearby metal objects induces substantially equal magnitudes of voltage in said two pick-up coils, and means connecting said pick-up coils in phase opposing relationship, said guiding means and said magnetic core having a mutually anterior position to substantially the entirety of said structure so as to be at all times in leading relation to the wire metal being deposited in the seam.

5. The method of obtaining magnetic balance between two pick-up coils in an eddy current seam follower, including an exciter coil mounted upon a magnetic core between the two pick-up coils, which method comprises the steps of adjusting the position of said exciter coil along the said core relative to the two pick-up coils in the absence of nearby metal objects so that a magnetic field set up in the said core by said exciter coil induces voltages of like phase in the two pick-up coils, and adjusting the position of at least one of said pick-up coils along the said core so that under the above conditions the said exciter coil induces voltages of equal magnitude in said pick-up coils.

6. The method of obtaining a magnetic balance with, and introducing energy about a weld seam by means of, an eddy current type seam follower, said follower having a magnetic core, and including thereon two spaced apart pick-up coils and an exciter coil mounted upon the magnetic core between the two pick-up coils, which method comprises the steps of adjusting the position of the said exciter coil along the core relative to the pick-up coils in the absence of nearby metal objects so that a magnetic field set up in the said core by the said exciter coil induces voltages of like phase in the two pick-up coils, adjusting the position of at least one of said pick-up coils along the core so that under the above conditions a balance will be obtained whereby the said exciter coil induces voltages of equal magnitude in the said pick-up coils, and establishing low frequency flux linkages between the legs of the core and the workpieces defining said seam, by energizing the balanced pick-up coils through application of an impressed alternating voltage of below approximately 400 cycles per second upon the exciter coil.

7. The method of claim 6 wherein the workpieces defining said seam as aforesaid consist essentially of a highly electrically conductive metal of the group consisting of copper and aluminum, and wherein the frequency of the alternating voltage impressed upon the exciter coil is at least as low as approximately 60 cycles per second.

References Cited by the Examiner

UNITED STATES PATENTS

| | | | |
|---|---|---|---|
| 2,810,880 | 10/57 | Buccicone | 324—34 |
| 2,871,432 | 1/59 | Marzetta | 318—31 |
| 2,921,179 | 1/60 | Anderson | 219—125 |
| 2,957,129 | 10/60 | Irwin | 324—37 |
| 3,076,889 | 2/63 | Enk | 219—125 |

RICHARD M. WOOD, *Primary Examiner.*